(12) United States Patent
Hodnefjell et al.

(10) Patent No.: US 9,297,470 B2
(45) Date of Patent: Mar. 29, 2016

(54) DEVICE FOR A VALVE (75) Inventors: Lars Gunnar Hodnefjell, Mosteroy (NO); Helge Sverre Eide, Kleppe (NO)

(73) Assignee: Blue Logic AS, Sandnes (NO)

(*) Notice: Subject to any disclaimer, the term of this patent is extended or adjusted under 35 U.S.C. 154(b) by 0 days.

(21) Appl. No.: 13/982,719

(22) PCT Filed: Feb. 8, 2012

(86) PCT No.: PCT/NO2012/050018
§ 371 (c)(1),
(2), (4) Date: Sep. 9, 2013

(87) PCT Pub. No.: WO2012/108776
PCT Pub. Date: Aug. 16, 2012

(65) Prior Publication Data
US 2013/0334448 A1    Dec. 19, 2013

(30) Foreign Application Priority Data

Feb. 9, 2011   (NO) .................................... 20110227

(51) Int. Cl.
*F16K 27/06* (2006.01)
*E21B 33/037* (2006.01)
*E21B 33/038* (2006.01)
*E21B 41/04* (2006.01)

(52) U.S. Cl.
CPC ............. *F16K 27/065* (2013.01); *E21B 33/037* (2013.01); *E21B 33/038* (2013.01); *E21B 41/04* (2013.01)

(58) Field of Classification Search
CPC ...................................................... F16K 27/06
USPC .................... 137/595, 580; 285/121.6, 145.2
See application file for complete search history.

(56) References Cited

U.S. PATENT DOCUMENTS

| | | | | |
|---|---|---|---|---|
| 2,753,195 | A * | 7/1956 | Palmer ..................... | 137/614.03 |
| 2,990,851 | A * | 7/1961 | Jackson, Jr. et al. ......... | 137/595 |
| 3,608,582 | A * | 9/1971 | Lambert ....................... | 137/595 |
| 3,640,299 | A * | 2/1972 | Nelson ............... | 137/1 |
| 3,929,161 | A * | 12/1975 | Boelkins .................. | 137/625.69 |
| 4,852,611 | A * | 8/1989 | Knerr et al. ................... | 137/595 |

(Continued)

FOREIGN PATENT DOCUMENTS

| | | |
|---|---|---|
| GB | 2 190 969 A | 12/1987 |
| WO | 89/03002 A1 | 4/1989 |

OTHER PUBLICATIONS

International Search Report for parent application PCT/NO2012/050018, having a mailing date of May 8, 2012.

(Continued)

*Primary Examiner* — John K Fristoe, Jr.
*Assistant Examiner* — Christopher Ballman
(74) *Attorney, Agent, or Firm* — Andrus Intellectual Property Law, LLP (57) ABSTRACT

A valve assembly comprises a hot stab and a complementary connection block. The hot stab and the connection block are each provided with a pressure balanced rotating sleeve. When the hot stab is disconnected from the connection block, the rotating sleeve is in a closed position and fluid is not allowed to flow through the :hot stab. The rotating sleeve of the connection block is also in a closed position such that fluid is not allowed to flow through the connection block. The hot stab may be connected and disconnected to the connection block without reducing the fluid pressure.

14 Claims, 10 Drawing Sheets (56) References Cited

U.S. PATENT DOCUMENTS

2006/0219412 A1* 10/2006 Yater .............................. 166/346
2010/0173495 A1* 7/2010 Thakur et al. ................. 438/694

OTHER PUBLICATIONS

Written Opinion for parent application PCT/NO2012/050018, having a mailing date of May 8, 2012.

* cited by examiner

DEVICE FOR A VALVE

CROSS-REFERENCE TO RELATED APPLICATIONS

This application is the U.S. national stage application of International Application No. PCT/NO2012/050018, filed Feb. 8, 2012, which International application was published on Aug. 16, 2012 as International Publication No. WO 2012/108776 A1 in the English language and which application is incorporated herein by reference. The International application claims priority of Norwegian Patent Application No. 20110227, filed Feb. 9, 2011, which application is incorporated herein by reference.

BACKGROUND

This invention concerns a valve assembly and connection of two valve assemblies. More particularly, the valve assembly concerns shut-off of a liquid flow in such a manner that subsequent draining is avoided, and that two components having each a valve assembly according to the invention may be separated using little force, and without reducing the system pressure.

In order to shut off a fluid flow in a conduit, it is known to use a valve. A number of types of valves are known in the field. A group of valves is known as quarter-turn valves and comprise, for example, ball valves, butterfly valves and plug valve. The characteristic of a ball valve is that the valve element is ball-shaped. The valve element, hereinafter termed the ball, has a through opening. When the opening of the ball is in-line with the longitudinal direction of the valve, the direction of which is defined as the direction between the centre of the inlet opening and the centre of the outlet opening, fluid flows through the valve. When the opening of the ball is perpendicular to the longitudinal direction of the valve, the valve is closed. A ball valve has a simple packer arrangement. One packer lies flat and sealingly against the ball at the side facing the inlet of the valve, and one packer lies flat and sealingly against the ball at the side facing the outlet of the valve. This prevents the fluid from penetrating between the surface of the ball and the internal mantel of the valve housing. Such a leakage is undesirable.

A plug valve is comprised of a cylindrical plug or a plug tapering off into a frustum shape. A plug valve may be provided with one through opening or it may be provided with several through openings, or it may be a so-called 3-way valve having several channels within the plug. Such plug valves are known from, for example, laboratory equipment and may be made from glass. The formed annulus between the surface of the plug and the valve housing may be filled with a lubricant in order for the plug to be rotatable.

In the field of underwater technology, it has for a long time been customary to transfer hydraulic energy from, for example, an underwater vessel, oftentimes denoted as a ROV (Remote Operated Vehicle), by means of a connection mandrel, also termed a hot stab in the field. The hot stab may be displaced into a connection block belonging to to a fixed underwater installation or belonging to a temporarily placed piece of equipment or tool. The connection block has a through opening for the hot stab. This ensures that the nose of the hot stab does not abut a surface and becomes damaged. A ROV has a considerable weight, it is remote-controlled, and currents in the water may allow a ROV and its equipment to collide with a considerable force into other structures.

The hot stab may be, and usually is, provided with several conduits for various fluid circuits. Channels in the hot stab fit in a complementary manner into corresponding channels in the connection block when the hot stab is located in its operational position in the connection block. Such hot stabs are, to a large extent, standardized and well-known to a skilled person.

During connection or disconnection of the hot stab with respect to the connection block, the fluid circuits must be shut off, whereby the connection/disconnection may take place without having to overcome the pressure-forces of the fluid. Even though the hot stab is pressure-balanced during shut-off, the pressurization will increase the packer friction, whereby especially a disconnection must overcome this packer friction. Shut-off of the fluid circuits take place via use of isolation valves in the fluid channels leading onto the connection block, and in isolation valves in the fluid channels leading onto the hot stab.

It is not desirable for the fluid to drain out from the connection during connection operations or disconnection operations, and this is subject to strict statutory requirements. In order to reduce a discharge as much as possible, valves are placed as close as possible to the mouth portion of the fluid circuits. Within the hot stab, it is known to place directly pilot-controlled check valves in the mouth portion of the fluid conduits. However, the known check valves are not completely impervious, nor can they withstand a full system pressure.

In many cases, it is not possible to replace the connection block and, in some areas of application, and for safety reasons, a double set of isolation valves are therefore required for each fluid conduit. A connection block having three fluid conduits may thus be provided with 3 to 6 valves with associated apparatuses in order to control them, depending on statutory requirements and/or system requirements.

Patent publication WO 89/03002 describes a coupling connection for offshore use in the petroleum industry. The coupling connection consists of a male member and a female member. The wall of the female member forms a circular cavity, and the wall is provided with radial bores for a fluid. The bottom portion of the cavity is provided with o a coupling mechanism. At the side facing the cavity of the female member, the wall is provided with a rotatable first sleeve, hereinafter termed the female sleeve. The female sleeve forms a rotatable closing element. The female sleeve, at the inside thereof, is sloping slightly having the largest diameter in a portion facing the open end of the female member, and having the smallest diameter in a portion facing the bottom portion of the cavity. The female sleeve is provided with radial bores. In an open position, the radial bores of the wall will correspond to the radial bores in the female sleeve. When the female sleeve is rotated into a closed position, the radial bores of the wall will terminate against an impervious portion in the female sleeve. A packer arrangement having two concentrically arranged packers concentrically surrounding the radial bore, and a further droplet-shaped packer which will surround both the bore in the wall and the bore in the female sleeve when the female sleeve is in a closed position, is also described. By so doing, a fluid will not be able to penetrate into the annulus formed between the wall and the female sleeve. The male member fits in a complementary manner to the female member. The male member is comprised of a mandrel which, in one end portion thereof, is provided with a coupling mechanism structured on as to be temporarily lockable to a locking mechanism of the female member. In its mantel, the male member is provided with radial bores connected to the channels in the mandrel. In a portion, the channels extend axially within the mandrel. A portion of the mandrel of the male member, the portion of which is located proximal to the locking mechanism of the male member, is surrounded by a rotatable second sleeve, hereinafter termed the male sleeve. The male sleeve is provided with radial bores. In principle, the male sleeve cooperates with the mandrel in the same manner as the female sleeve cooperates with the wail of the female sleeve and may be in an open position and a closed position. Between the mandrel and the male sleeve, the male member is provided with the same packer arrangement as described above. By so doing, a fluid will not be able to penetrate into the annulus formed between the mandrel and the male sleeve. The male sleeve, at the outside thereof, is tapering slightly having the smallest diameter proximal to the locking mechanism of the male member. When the locking mechanism of the male member is engaged with the locking mechanism of the female member, the outside of the male sleeve will fit in a complementary manner to the inside of the female sleeve. The coupling connection is equipped with a guide, whereby the radial bores of the female sleeve correspond to the radial bores of the male sleeve. The coupling connection is further provided with ring-shaped packer elements sealing between the radial bores of the female sleeve and the male sleeve. After connection of the coupling connection, the fluid communication between the female member and the male member is opened upon simultaneously rotating the female sleeve and the male sleeve from a closed position to an open position. Disconnection takes place by rotating, at first, the female sleeve and the male sleeve from an open position to a closed position, and then activating the locking mechanism, whereby the male member may be pulled out of the female member.

SUMMARY

An object of the invention is to prevent undesirable contamination during connection and disconnection between a hot stab and a connection block. A further object is to simplify such a complicated valve arrangement.

Another object of the invention is to remedy or to reduce at least one of the disadvantages of the prior art, or at least to provide a useful alternative to the prior art.

The objects are achieved by virtue of features disclosed in the following description and in the subsequent claims.

In a first aspect, a device for a valve comprising a fixed part provided with at least one fluid port and a rotatable sleeve provided with at least one bore is provided, wherein:
the sleeve is structured in a manner allowing it to rotate the bore in-line with the fluid port in order to allow a fluid to flow through the fluid port and the bore when the sleeve is in an open position;
the sleeve is structured in a manner allowing it to rotate the bore away from the fluid port in order not to allow a fluid to flow through the fluid port and the bore when the sleeve is in a closed position;
the fixed part and the sleeve form an annulus between the fixed part and the sleeve; and
the annulus is restricted axially by two packer elements in the axial directions of the sleeve and the fixed part, wherein one of the two packer elements is located at one side of the fluid port, and the other of the two packer elements is located at the opposite side of the fluid port, and wherein the annulus is in fluid communication with the fluid port of the fixed part.

When the valve forms a valve in a male member, said annulus substantially may be further restricted by a packer element surrounding said bore in a portion facing said annulus. Said fluid port, in a portion facing the annulus, may be provided with a peripherally directed recess structured in a manner allowing it to form a fluid channel past the packer element when the sleeve is in an open position. This allows the annulus to be pressure-balanced with the fluid in the fluid port of the fixed part independent of whether the valve is an open or closed position. A surface of the fixed part of the male member, in a portion located around the fluid port, may be comprised of a o spherical portion extending peripherally around the fixed part. The male member may be comprised of a hot stab. The fluid port may be in fluid communication with an axial fluid channel in the fixed part of the male member, and the fluid channel may be in fluid communication with a proximal fluid port on an external surface of the fixed part.

When the valve forms a valve in a female member, said annulus may be further restricted by a ring-shaped packer element surrounding a bore. An external mantel surface of the sleeve of the female member, in a portion located around the bore in the sleeve, may be comprised of a spherical portion extending peripherally around the external mantel surface of the sleeve. The female member may be comprised of a connection block structured so as to accommodate said male member in a complementary manner.

In an alternative embodiment, the female member may be provided with a further bore, and the sleeve may be provided with a further bore; wherein the two bores may be structured in a manner allowing them to be in fluid communication with each other when the sleeve is in a closed position; wherein the bores may be structured in a manner allowing them to be in fluid communication with a third annulus; wherein each of the bores may be provided with a screw element; wherein the screw element may be structured in a manner allowing it to be in selectable fluid communication with a reservoir for hydraulic fluid and with an ambient fluid; wherein the screw element may be structured in a manner allowing it to be in fluid communication with a pump via a check valve; and wherein the pump may be structured in a manner allowing it to be in fluid communication with a collecting unit via a check valve. In this embodiment, the advantage thereof is that it allows the third annulus to be filled with hydraulic fluid before initiating the operation, thereby avoiding that the hydraulic fluid is contaminated by the ambient fluid, which generally will he seawater, and that the third annulus is filled with ambient fluid before disconnection, whereby hydraulic fluid does not discharge to the surroundings. A mixture of hydraulic fluid and ambient fluid is stored in a contamination-free manner in the collecting unit and subsequently may be introduced to a suitable after-treatment.

In a second aspect, a method of allowing a male member to be connected, in a contamination-free manner, to a female member is provided, both of which are described hereinbefore, and to disconnect the male member from the female member, wherein the method comprises the steps of:
a) inserting the male member into the female member;
b) replacing ambient fluid in a third annulus with a hydraulic fluid by virtue of a pump, as described hereinbefore, sucking a hydraulic fluid into the annulus from a reservoir and onto the annulus via a channel in a screw element;
c) pumping a mixture of ambient fluid and hydraulic fluid from step (b) into a collecting unit;
d) rotating sleeves into an open position;
e) rotating the sleeves into an closed position; and
f) pulling the male member out of the female member.

Between steps e) and f), the method may further comprise the steps of:
$e_1$) replacing hydraulic fluid in the third annulus with the ambient fluid by virtue of the pump sucking ambient fluid into the annulus from the surroundings and onto the annulus via the channel in the screw element; and e₂) pumping the mixture of ambient fluid and hydraulic fluid from step e₁) into the collecting unit.

BRIEF DESCRIPTION OF THE DRAWINGS

Hereinafter, examples of preferred embodiments are described and are depicted on the accompanying drawings, where.

DETAILED DESCRIPTION OF THE DRAWINGS

In the figures, reference numeral 1 denotes a male member comprised of a hot stab according to the invention. Hereinafter, those parts necessary to understand the invention are described, whereas other constructive details are omitted.

Figure 1:
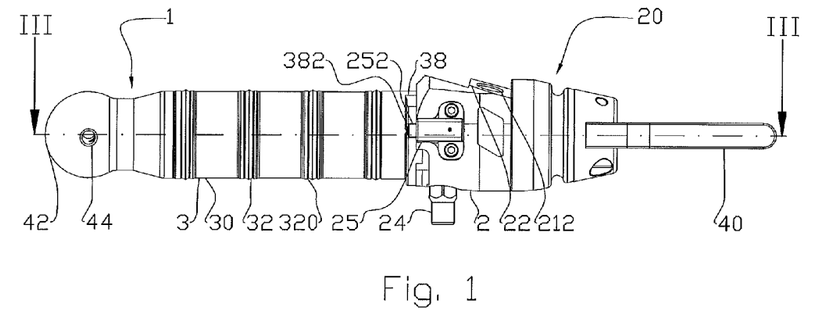
FIG. 1 shows a side view of a hot stab according to the invention.
Figure 2:
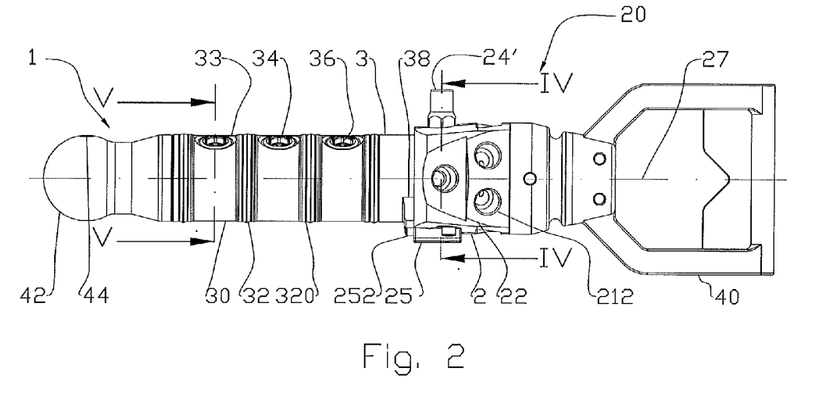
FIG. 2 shows a side view of another side of the hot stab, wherein the hot stab, as viewed from the handle and along the longitudinal axis of the hot stab, is rotated 90° counter clockwise relative to the hot stab shown in FIG. 1.
Figure 3:
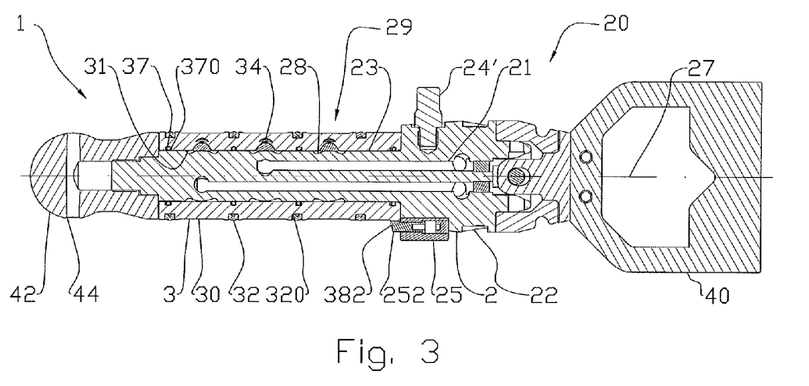
FIG. 3 shows a longitudinal section view through the hot stab shown in FIG. 2.
Figure 4:
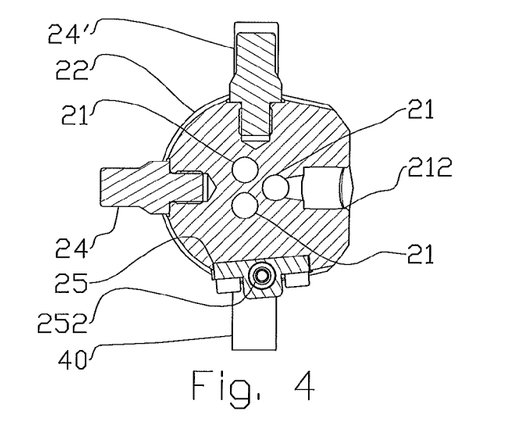
FIG. 4 shows, in an enlarged scale, a cross-sectional view through the hot stab in the connection portion of the hot stab.

The hot stab 1 comprises a fixed part in the form of a mandrel 2, a sleeve 3, a handle 40 and a nose 42. The sleeve 3 rotatably surrounds a valve portion 29 of the mandrel 2. The handle 40 is fixed to a connection portion 20 on the mandrel 2 located proximal with respect to the handle 40. Internally the nose 42 is provided with a thread portion and is fixed to the valve portion 29 of the mandrel in a threaded portion in the one end portion of the mandrel 2, as shown in FIG. 3.

Figure 6:
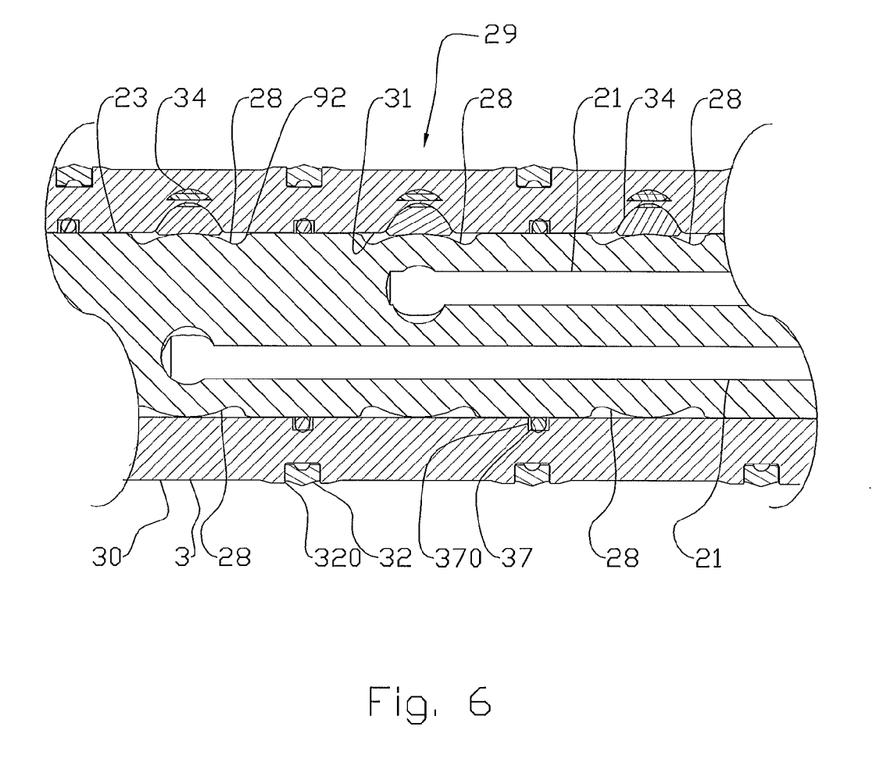
FIG. 6 shows, in larger scale, a cutout of FIG. 3 of a portion of the valve portion of the hot stab.

In the figures, the mandrel 2, in a portion thereof is shown provided with three fluid channels 21 extending axially as bores within the interior of the mandrel 2. The mandrel 2 may be provided with one fluid channel 21 or a plurality of fluid channels 21. The fluid channel 21, at the proximal end thereof as viewed from the handle 40, is conducted onto an external surface 22 of the connection portion 20 and terminates in a proximal fluid port 212 in the external surface 22. The fluid port 212 is provided, with a threaded portion in a manner known per se. The fluid channel 21, at the distal end thereof, terminates in a surface 23 on the valve portion 29 of the mandrel in a distal fluid port 214. in portions near the fluid port 214, the surface 23 is formed as a spherical portion 28 extending peripherally around the valve portion 29 of the mandrel 2, see FIG. 6. see FIG. 6.

The mandrel 2, on the external surface 22 thereof, is provided with two guide pins 24 and a locking safeguard 25. These will be described in further detail hereinafter.

Figure 11A:
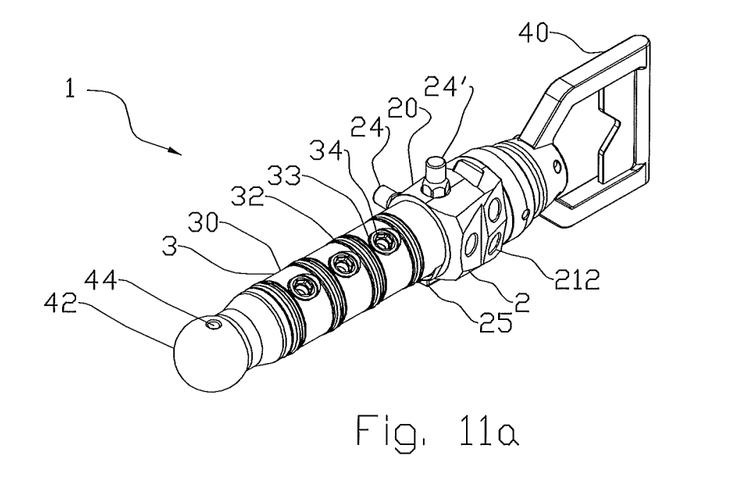
FIG. 11a-b shows, in another scale, a perspective view of (a) the hot stab and (b) the connection block.

The sleeve 3, on the outside thereof, is provided with a plurality of peripheral, milled-out first packer grooves 320 accommodating ring-shaped first packer elements 32. In the figures, four packer elements 32 are shown. The packer element 32 may be comprised of an O-ring or a custom-made, profiled packer element 32. The sleeve 3 is further provided with a plurality radial through bores 33, shown most clearly in FIG. 11a. In the figures, three bores 33 are shown. In the opening facing an external wall 30 of the sleeve, the bore 33 is provided with a threaded portion. A threaded screw element 34, hereinafter termed a packer support 34, is screwed into the bore 33 until the packer support 34 abuts a shoulder 332 in the bore 32. At the end facing an internal wall 31 of the sleeve 3, the packer support 34 is provided with a second packer groove 350 structured in a manner allowing it to accommodate a second ring-shaped packer element 35. The packer element 35 may be comprised of an O-ring or a seat packer, as known from, for example, ball valves. The packer support 34 is provided with a through channel 36 extending from the internal wall 31 of the sleeve 3 un and onto the external wall 30. The internal wall 31 of the sleeve 3 is provided with a plurality of circular, milled-out third packer grooves 370 accommodating ring-shaped third packer elements 37. In the figures, four packer elements 37 are shown. The packer element 37 may be comprised of an O-ring or a so-called lip packer. The sleeve 3, at the proximal end portion thereof, is provided with a collar 38. The collar 38 is provided with a locking groove 382 structured to accommodate a locking pin 252. The locking pin 252 is provided with a spring and is movably attached within the safeguard 25.

The nose 42 is provided with a through bore 44. The through bore 44 makes it easier to tighten the nose 42 on the threaded end portion of the mandrel 2 by means of a through mandrel or similar.

Figure 5A:
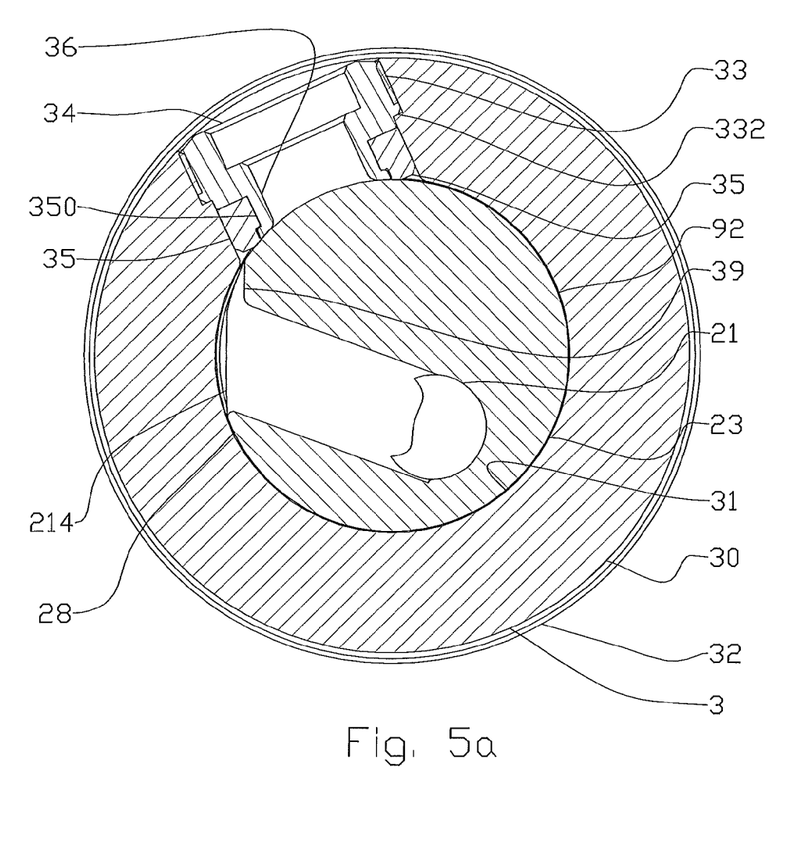
FIG. 5a-b shows, in a larger scale than that of FIG. 4, a cross-sectional view through the hot stab in the valve portion of the hot stab when the valve is closed (5a), and when the valve is open (5b)
Figure 5B:
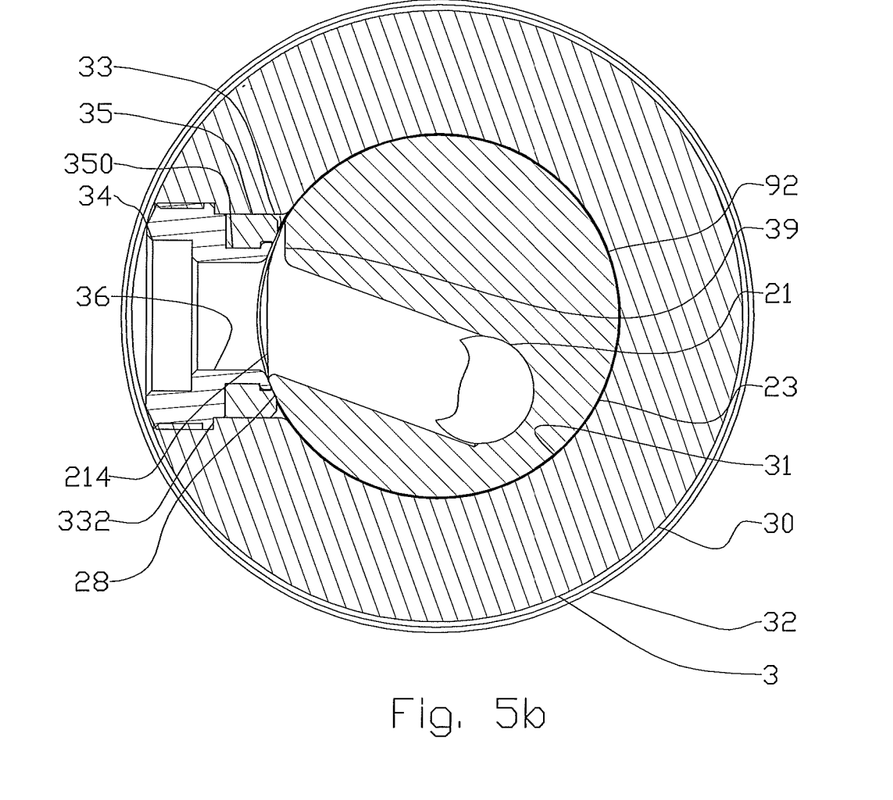

FIGS. 5a and *b* show the outlet of the distal fluid port 214 and the bore 33 in further detail. In a portion facing the surface 23, the distal fluid port 214 is provided with a recess 39 in a tangential direction being perpendicular to the longitudinal axis 27 in the surface 23 of the mandrel 2.

Figure 7:
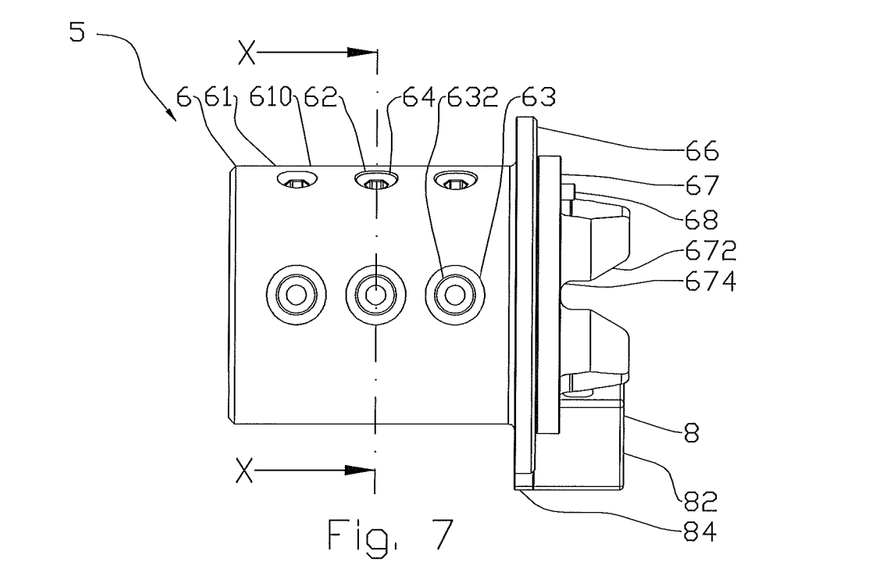
FIG. 7 shows, in the same scale as that of FIG. 1, a side view of a connection block according to the invention.

Fig. 7 shows a female member comprised of a connection block 5 according to the invention. The connection block 5 comprises a fixed part in the form of an external housing 6, an internal, rotatable sleeve 7, see FIGS. 9 and 10, and an operating element 8 in the proximal end of the housing 6. The operating element 8 is structured to rotate the sleeve 7.

The housing 6, in a circular wall portion 61 thereof, is provided with a plurality of through bores 62, 63. In the figures, three bores 62 and three bores 63 are shown. In the opening facing an external wall 610 of the housing, the bore 62 is provided with a threaded portion. A threaded screw element 64 is screwed into the bore 62 until the screw element 64 abuts a shoulder 622 in the bore 62. The screw element 64, at the end thereof facing an internal wall 618 of the housing 6, is provided with a fourth packer groove 650 structured in a manner allowing it to accommodate a fourth ring-shaped packer element 65. The packer element 65 may be comprised of an O-ring or a seat packer, as known from, for example, ball valves. The bore 63 comprises a threaded portion 632 and forms a fluid port 634 on the internal wall 618 of the housing 6. The housing 6, at the proximal end thereof, is provided with a collar 66. The collar 66 is provided with a connection element 67. The connection element 67 is provided with a V-shaped guide groove 672, and the guide groove 672, at bottom 674 thereof, is rounded to allow the bottom 674 to fit in a complementary manner to the guide pin 24 of the hot stab 1. The connection element 67 is further provided with a spring-loaded safety pin 68. The operating element 8 comprises a gripping element 82 fixed onto an arm 84. The arm 84 extends from the gripping element 82 and onto the sleeve 7 in a slit (not shown) between the connection element 67 and the housing 6. The gripping element 82 is provided with a safety arm 86 extending peripherally from the gripping element 82 on the outside of the V-groove 672. The safety arm 86, in a surface thereof facing an axis 76 of the housing 6, is provided with a groove 68. The groove 88 is structured in a manner allowing it to accommodate the guide pin 24.

Figure 9:
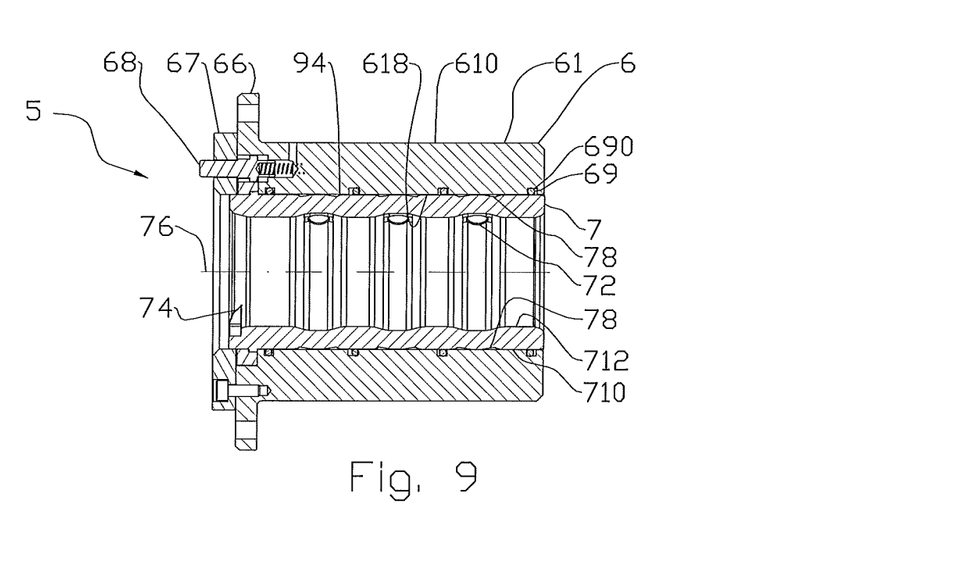
FIG. 9 shows, in the same scale as that of FIG. 8, a longitudinal section view through the connection block.

The housing 6, on the internal wall 618 thereof, is provided with a plurality of circular, milled-out fifth packer grooves 690 accommodating ring-shaped fifth packer elements 69, see FIG. 9. In the figures, four packer elements 69 are shown. The packer element 69 may be comprised of an O-ring or a lip packer.

Figure 10A:
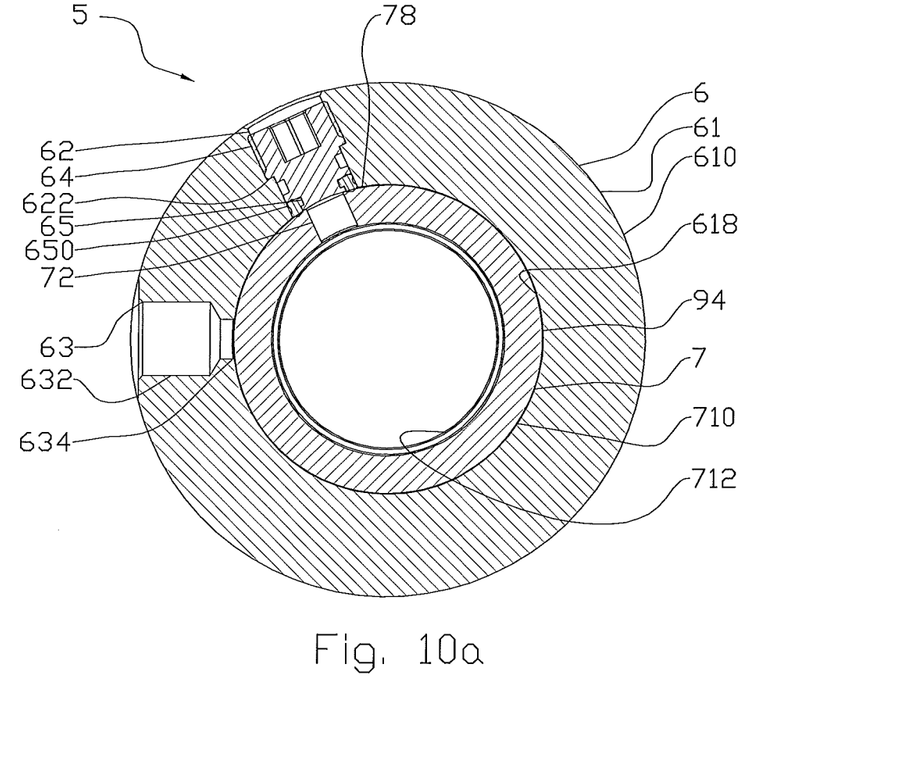
FIG. 10a-b shows, in a larger scale than that of FIG. 9, a cross-sectional view through the connection block when the valve is closed (10a), and when the valve is open (10b)
Figure 10B:
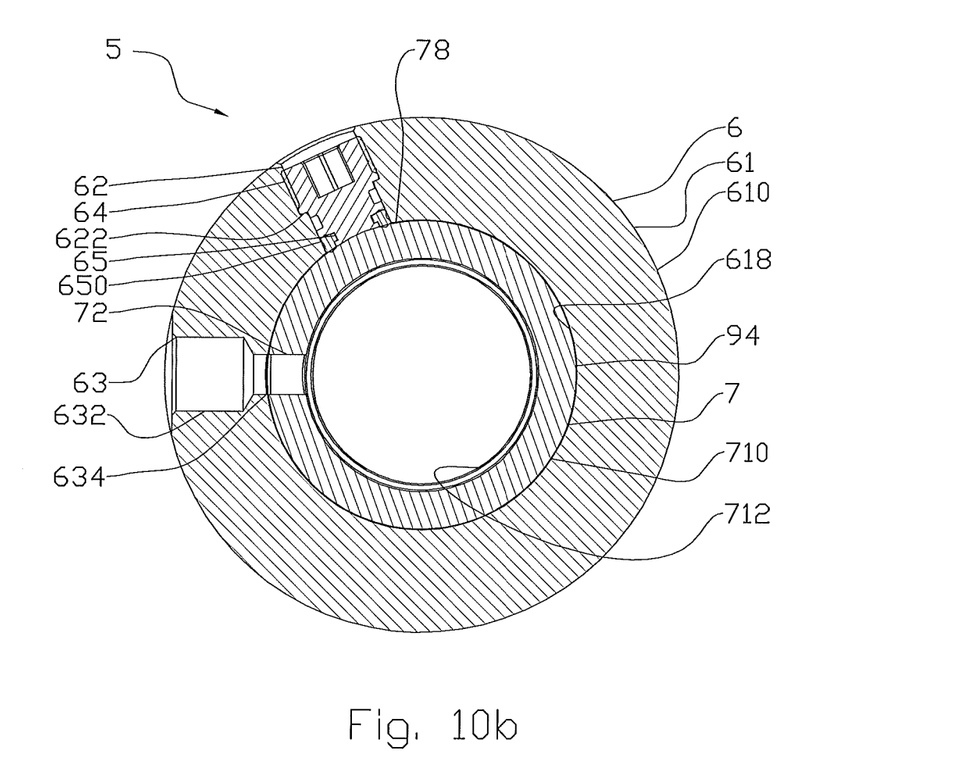

The sleeve 7 is shown in further detail in FIGS. 9 and 10. The sleeve 7 is shown provided with three through bores 72 extending from an external mantel surface 710 of the sleeve 7 and onto an internal mantel surface 712 of the sleeve. The external mantel surface 710 of the sleeve 7, in a portion thereof located around the through bore 72, is formed with a spherical portion 78 extending peripherally around the sleeve 7. The sleeve 7, at the proximal end thereof, is provided with a milled-out groove 74 structured to accommodate the collar 38 of the hot stab 1.

When the hot stab 1, is separated from the connection block 5, the sleeve 3 is rotated to the shut-off position shown in FIG. 5a. The hot stab 1 is connected to hydraulic conduits (not shown) in the proximal fluid ports 214 by means of threads, as known in the field, and this is not discussed in further detail. The hydraulic fluid in the hydraulic conduits may be pressurized or it may have a pressure slightly exceeding the ambient pressure. The hydraulic fluid fills the fluid channels 21 and the distal fluid port 214. Further, the hydraulic fluid fills an annulus 92 formed between the external surface 22 of the mandrel 2 and the internal wall 31 of the sleeve 3. The formed annulus 92 is defined axially by two third ring-shaped packer elements 37, one on each side of the distal fluid port 214. The annulus 92 is also defined by the ring-shaped second packer element 35. The second packer element 35 prevents the hydraulic fluid from flowing out through the channel 36 of the screw element 34. Accordingly, the hot stab 1 will not leak fluid in a disconnected and/or shut-off position.

When the connection block 5 is separated from the hot stab 1, the sleeve 7 is rotated to the shut-off position shown in FIG. 10a. The connection block 5 is connected to threaded hydraulic conduits (not shown) in the threaded bores 63, as known in the field, and this is not discussed in further detail. The hydraulic fluid in the hydraulic conduits may be pressurized or it may have a pressure slightly exceeding the ambient pressure. The hydraulic fluid fills the bores 63. Further, the hydraulic fluid fills an annulus 94 formed between the internal mantel surface 618 of the housing 6 and the external mantel surface 710 of the sleeve 7. The formed annulus 94 is defined axially by two fifth ring-shaped packer elements 69, one on each side of the bore 63. The annulus 94 is also defined by the ring-shaped fourth packer element 65. As shown in FIG. 10a, the fourth packer element 65 surrounds the bore 72 of the sleeve when the sleeve 7 is in the shut-off position. By so doing, the pressurized hydraulic fluid is prevented from flowing out through the bore 72. Accordingly, the connection block 5 will not leak fluid in a disconnected and/or shut-off position.

Figure 12:
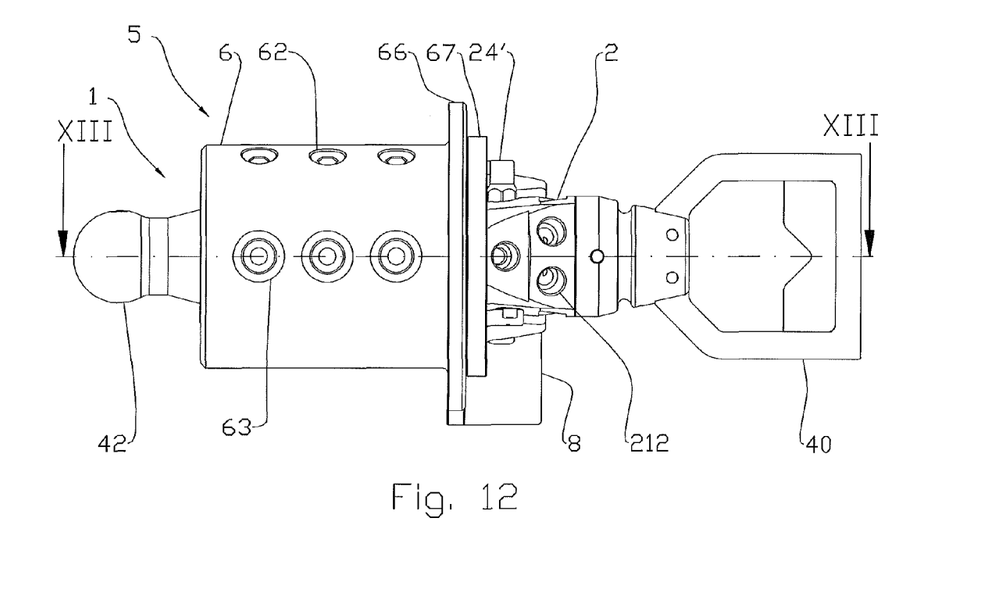
FIG. 12 shows, in the same scale as that of FIG. 1 and FIG. 7, a side view of the hot stab when in operational position in the connection block.

During connection, the nose 42 of the hot stab 1 nose 42 is inserted into the proximal end of the sleeve 7 and the hot stab 1 is inserted further until the guide pin 24 bears against the bottom 674 of the V-groove, and the hot stab 1 is in the connection position as shown in FIG. 12. The nose 42 of the hot stab 1 projects, when in the connection position, out of the distal portion of the connection block 5. When the hot stab 1 is in the connection position, the guide pin 24' of the hot stab pushes the spring-loaded safety pin 68 of the connection block inwards. This releases the sleeve 7, whereby it may be rotated about the axis 76. In the connection position, the edge of the connection element 67 of the connection block 5 will push in the locking pin 252 of the hot stab, whereby the sleeve 3 is released and may be rotated around the axis 27. in the connection position, the axis 27 and the axis 76 coincide.

Figure 8:
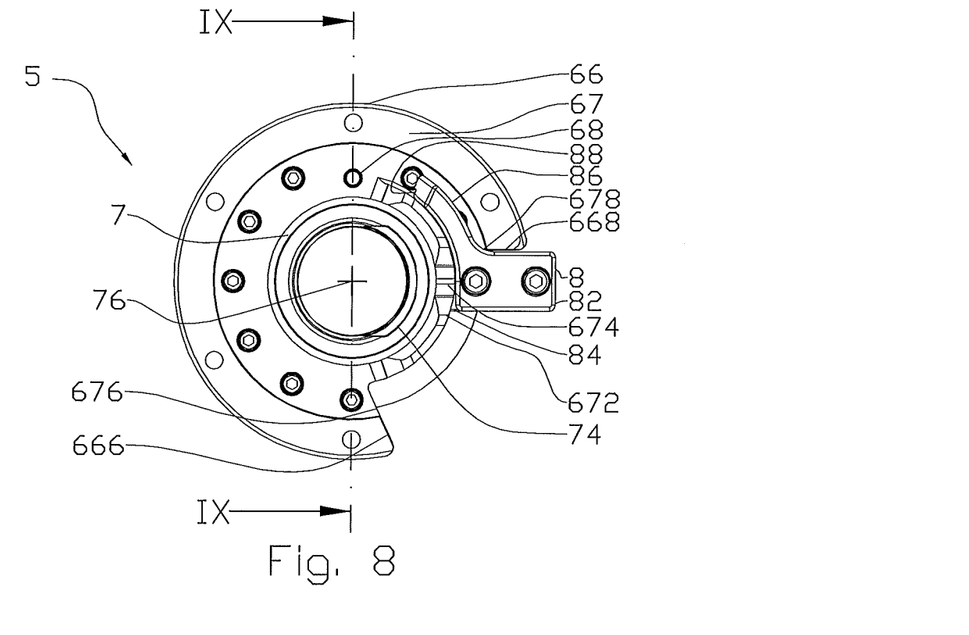
FIG. 8 shows, in the same scale as that of FIG. 7, an end view of the connection block.
Figure 11B:
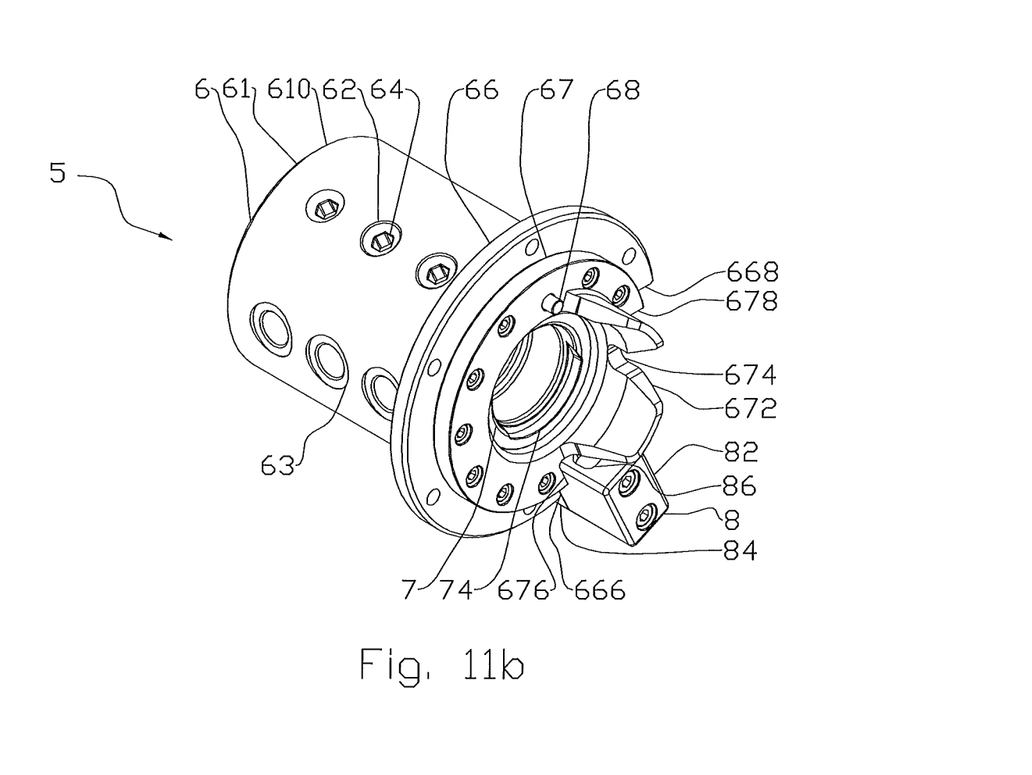

In the connection position, the operating element 8 is rotated from a shut-off position, as shown in FIG. 11b, and onto an open position, FIG. 8. The movement of the operating element 8 is restricted in a first direction of rotation by a first stop edge 666 and 676 of the collar 66 and the connection element 67, respectively, and in a second direction of rotation by a second stop edge 668 and 678 of the collar 66 and the connection element 67, respectively. In a shut-off position, the operating element 8 bears against the first stop edge 666, 676 and, in an open position, the operating element 8 bears against the second stop edge 668, 678. The arm 84 of the operating element 8 is conveyed in a slit formed between the housing 6 and the connection element 67 (not shown). The arm 84 is fixed to the sleeve 7. When the operating element 8 rotates, the sleeve 7 simultaneously rotates about the axis 76. The groove 74 of the sleeve 7 entrains the collar 38 of the hot stab. The collar 38 is fixed to the sleeve 3 of the hot stab. By so doing, the sleeve 7 and the sleeve 3 will rotate simultaneously. Upon rotation, the safety arm 86 of the operating element 8 will be carried over the guide pin 24, whereby the groove 88 accommodates the free end of the guide pin 24. This prevents the hot stab 1 from being displaced in the proximal direction along the axis 27 once the operating element 8 starts rotating from the shut-off position onto the open position. Accordingly, if the operating element 8 is not turned completely to the shut-off position, the hot stab 1 and the connection block 5 cannot be assembled into, or disassembled from, a connection position.

The sleeve 3 is pressure-balanced between the fluid channel 21 and the annulus 92, which facilitates rotation of the sleeve 3. In an open position, as shown in FIG. 5b, the distal fluid port 214 is in fluid communication with the channel 36, and the channel 36 is filled with the pressurized hydraulic fluid. The recess 39 forms a connection underneath the second packer element 35, and between the channel 36/fluid channel 21 and the annulus 92. This ensures that the fluid pressure in the annulus 92 is the same as in the fluid channel 21 and the channel 36 and, hence, the sleeve 3 may be rotated, in a pressure-balanced manner, back to the shut-off position.

The sleeve 7 is pressure-balanced between the bore 63 and the annulus 94, which facilitates rotation of the sleeve 7. In an open position, as shown in FIG. 10b, the bore 63 is in fluid communication with the bore 72. Insofar as there is no packer element between the bore 63 and the bore 72, the pressure in the annulus 94 will be the same as in the bores 63, 72 and, hence, the sleeve 7 may be rotated, in a pressure-balanced manner, back to the shut-off position.

Figure 13:
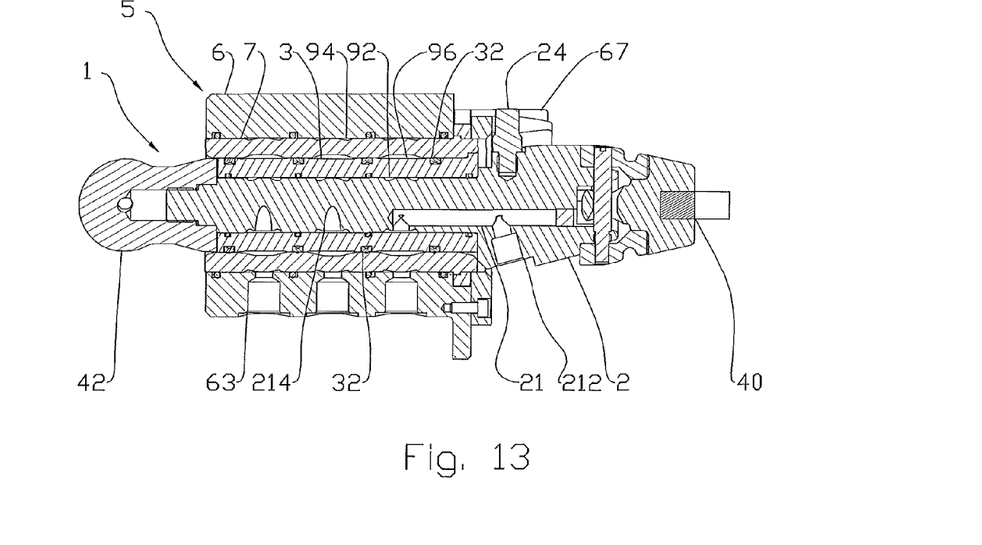
FIG. 13 shows, in the same scale as that of FIG. 12, a cross-sectional view of the hot stab when in operational position in the connection block.

When the hot stab 1 is inserted into the connection block 5, ambient pressure will exist at the outside 22 of the hot stab, and at the internal mantel surface 712 of the sleeve 7. Insofar as the cavity of the sleeve 7 is through-going, the hot stab 1 is inserted in a pressure-balanced manner into the connection block 5 to the connection position. The V-groove 672 and the guide pin 24 ensures that the bore 33 of the sleeve 3 coincides with the bore 72 of the sleeve 7 so as to allow them to be in fluid communication when the sleeves 3, 7 rotate into the open position. Between the external wall 30 of the sleeve 3 and the internal mantel surface 712 of the sleeve 7, a third annulus 96 is formed, as shown in FIG. 13. This third annulus 96 is defined axially by the ring-shaped first packer elements 32. In the figure, three such annuli 96 will be formed. The pressurized hydraulic fluid will flow into this third annulus 96. Upon shut-off, the third annulus 96 will be in fluid communication with the bore 62. This ensures that the hot stab I may be separated from the connection block 5 in a pressure-balanced manner.

Before separation of the hot stab 1 and the connection block 5, the sleeves 3, 7 close off the distal fluid port 214 and the bore 63, whereby foreign fluids and foreign bodies may not penetrate into the hydraulic fluid. Simultaneously, hydraulic fluid may not discharge to the surroundings when separation is initiated. Upon separation, only the hydraulic fluid located in the third annulus 96 and in the bore 72 may discharge to the surroundings.

The second packer element 35 seals against the spherical portion 28, as shown especially in FIGS. 5a and b. The fourth packer element 65 seals against the spherical portion 78, as shown in FIGS. 9, 10a and 10b. This makes use of prior art with respect to packers of this type and provides a simple and robust packer function. The second packer element 35 is fixed by the screw element 34, and the fourth packer element 65 is fixed by the screw element 64. Accordingly, the packer elements 35, 65 may therefore be checked over, and possibly be replaced, in a simple manner by unscrewing the screw elements 34, 64.

Figure 14:
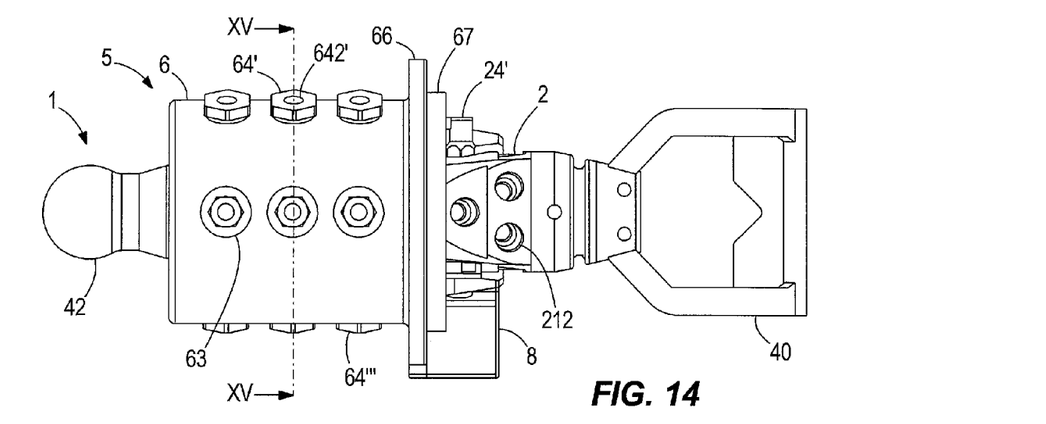
FIG. 14 shows, in the same scale as that of FIG. 12, a side view of the hot stab when in operational position in the connection block in an alternative embodiment.
Figure 15:
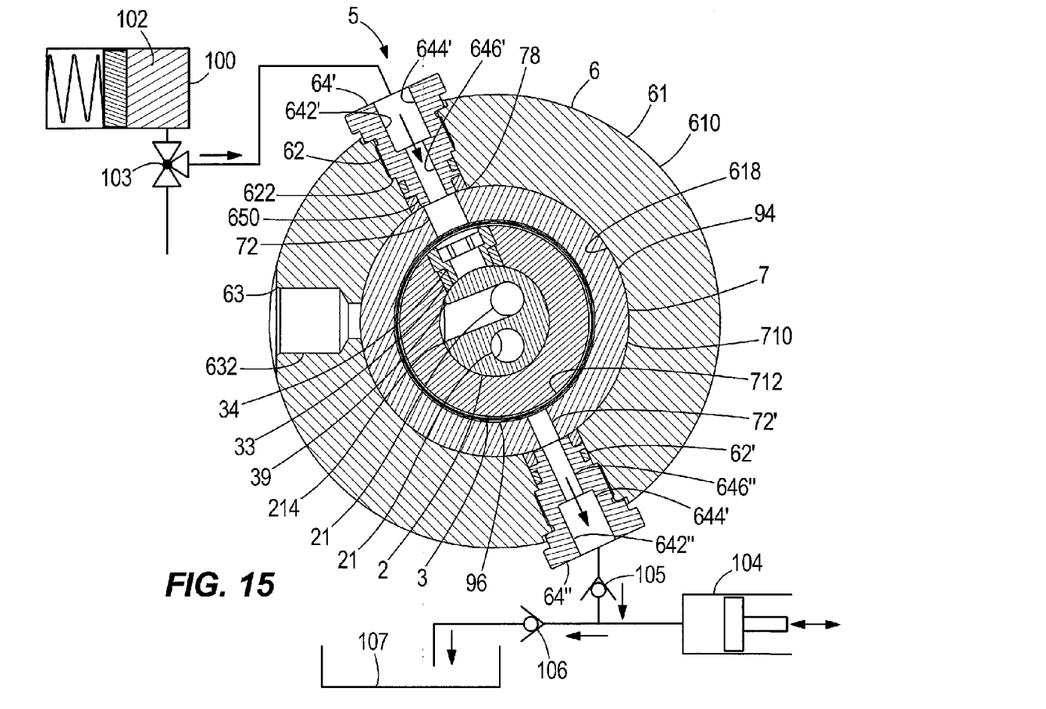
FIG. 15 shows, in the same scale as that of FIGS. 10a-b, a cross-sectional view of the hot stab and the connection block shown in FIG. 14.

When the hot stab 1 is inserted into the connection block 5, a small liquid volume comprised of the ambient liquid, for example seawater, will be trapped in the third annulus 96. When the sleeves 3, 7 rotate into the open position, hydraulic fluid will flow into the third annulus 96, and the ambient liquid in the third annulus 96 will enter into the hydraulic system and contaminate the hydraulic fluid. Correspondingly, upon having rotated the sleeves 3, 7 into the closed position when the operation is completed, a small volume of hydraulic fluid will be trapped in the third annulus 96. Upon separation of the hot stab 1 from the connection block 5, this hydraulic fluid will discharge to the surroundings, as described above, and will result in a small, local contamination. In FIGS. 14 and 15, an alternative embodiment is shown solving this problem. The screw element 64 has been given an alternative shape, whereby the screw element 64', 64" is provided with a through channel 642', 642" extending from the outside of the housing 6 and onto the internal wall 618. The channel 642', 642", at one internal end portion 644', 644" thereof, is provided with a threaded portion (not shown), and the other end portion 646', 646" of the channel is formed with a smaller internal diameter than that of the end portion 642', 642". The housing 6 is provided with a second bore 62' positioned diametrically opposite of the bore 62. The bore 62' is formed in the same manner as the bore 62 and is not discussed in further detail herein. The sleeve 7 is provided with a second bore 72' positioned diametrically opposite of the bore 72. The bore 72' is formed with the diameter as that of the end portion 646" of the channel 642". When the sleeve 7 is in a closed position, the bore 72 is allowed to fluid-communicate with the channel 642' and the bore 72' is allowed to fluid-communicate with the channel 642". When the sleeve 7 is in a closed position, the bore 72 and the bore 72' are allowed to fluid-communicate via the third annulus 96.

The connection block 5 may be provided with a closed reservoir 100 for hydraulic fluid 102 of a type known per se, the reservoir 100 of which is in fluid connection, via a three-way valve 103, with the screw element 64'. The connection block 5 may be further provided with a piston pump 104 in fluid connection with the screw element 64". Between the piston pump 104 and the screw element 64", the fluid connection is provided with a first check valve 105 structured in a manner allowing it to pass a. fluid from the screw element 64" and on the piston pump 104, and also structured to prevent fluid from flowing from the piston pump 104 and onto the screw element 64". Between the check valve 105 and the piston pump 104, the fluid connection is provided with a branched T-junction. The first branch is in fluid connection with the first check valve 105, the second branch is in fluid connection with the piston pump 104, and the third branch is in fluid connection with a second check valve 106 The second check valve 106, at an opposite side thereof relative to the piston pump 104, is in fluid connection with a collecting unit 107 of a type known per se. The second check valve 106 is structured to allow a fluid to flow from the piston pump 104 and onto the collecting unit 107, and is also structured to prevent a fluid from flowing from the collecting unit 107 and onto the piston pump 104.

Upon having inserted the hot stab 1 into the connection block, but before having rotated the sleeves 3, 7 onto the open position, the three-way valve 103 opens to a fluid communication from the reservoir 100 for hydraulic fluid 102. The piston pump 104 starts and will, during its suction phase, and due to the first check valve 105, suck hydraulic fluid 102 from the reservoir 100 via the third annulus 96. The second check valve 106 prevents fluid from being sucked from the collecting device 107. Further, and in the pressure phase thereof, the piston pump 104 will force fluid onto the collecting unit 107, and the first check valve 105 prevents fluid from being forced back to the third annulus 96. By virtue of this method, ambient fluid is washed out of the third annulus 96, and the annulus 96 is filled with hydraulic fluid 102. The mixture of ambient fluid and hydraulic fluid 102 is collected in the collecting unit 107, whereby hydraulic fluid 102 is not released to the surroundings. The three-way valve 103 is closed, and then the sleeves 3, 7 are rotated onto the open position. Before disconnecting the hot stab 1 from the connection block 5, the sleeves 3, 7 are rotated onto the closed position. The three-way valve 103 is opened so as to allow fluid communication with the ambient fluid. The piston pump 104 starts and will, during the suction phase thereof, suck ambient fluid into the third annulus 96 and, during the pressure phase thereof, will force the mixture of hydraulic fluid 102 and ambient fluid into the collecting unit 107. By virtue of this method, hydraulic fluid 102 is washed out of the third annulus 96, and the annulus 96 is filled with ambient fluid. The mixture of ambient fluid and hydraulic fluid 102 is collected in the collecting unit 107, whereby hydraulic fluid 102 is not released to the surroundings. The three-way valve 103 is closed, and the disconnection is completed.

The drawings show a valve assembly with a hot stab 1 and a connection block 5 in the manner they are known from use within the field of underwater technology. The skilled person will know that hydraulic couplings also are used onshore, and that the invention ma be used for couplings on mobile equipment, for example on construction machines and on stationary equipment.

The invention claimed is:

1. A device for a valve having a hot stab and a connection block, each comprising a fixed part provided with at least one fluid port and a rotatable sleeve provided with at least one bore, wherein:
   the sleeve is structured in a manner allowing the sleeve to rotate the bore in-line with the fluid port in order to allow a fluid to flow through the fluid port and the bore when the sleeve is in an open position in which the bore and the fluid port are completely aligned;
   the sleeve is structured in a manner allowing the sleeve to rotate the bore away from the fluid port in order not to allow a fluid to flow through the fluid port when the sleeve is in a closed position in which the bore and the fluid port are completely unaligned;
   the fixed part and the sleeve form an annulus between the fixed part and the sleeve;
   the annulus is restricted axially by two packer elements in the axial directions of the sleeve and the fixed part, wherein one of the two packer elements is located at one side of the fluid port, and the other of the two packer elements is located at the opposite side of the fluid port;
   wherein in the hot stab, the annulus is further restricted by another packer element attached to the sleeve and surrounding the bore in the sleeve in a portion facing the annulus;
   wherein in the hot stab, the annulus, at least between the packer element attached to the sleeve and the two packer elements, remains in fluid communication with the fluid port of the fixed part so that the sleeve remains pressure-balanced between the fluid port and the annulus regardless of whether the sleeve is in the open position or the closed position; and
   wherein in the connection block, the annulus, at least between the bore and the two packer elements, remains in fluid communication with the fluid port of the fixed part so that the sleeve remains pressure-balanced between the bore and the annulus when the sleeve is moved between the open position and the closed position.

2. The device for a valve according to claim 1, wherein in the hot stab, the fluid port, in a portion facing the annulus, is provided with a peripherally directed recess structured in a manner allowing it to form a fluid channel past the packer element attached to the sleeve when the sleeve is in an open position.

3. The device for a valve according to claim 1, wherein in the hot stab, the fluid port is in fluid communication with an axial fluid channel in the fixed part, and the fluid channel is in fluid communication with a proximal fluid port on an external surface of the fixed part.

4. A device for a valve having a hot stab and a connection block, each comprising a fixed part provided with at least one fluid port and a rotatable sleeve provided with at least one bore, wherein:
   the sleeve is structured in a manner allowing the sleeve to rotate the bore in-line with the fluid port in order to allow a fluid to flow through the fluid port and the bore when the sleeve is in an open position;
   the sleeve is structured in a manner allowing the sleeve to rotate the bore away from the fluid port in order not to allow a fluid to flow through the fluid port when the sleeve is in a closed position;
   the fixed part and the sleeve form an annulus between the fixed part and the sleeve; and
   the annulus is restricted axially by and located between two packer elements in the axial directions of the sleeve and the fixed part, wherein one of the two packer elements is located at one side of the fluid port, and the other of the two packer elements is located at the opposite side of the fluid port;
   wherein in the hot stab, the annulus is further restricted by a packer element surrounding the bore in a portion facing the annulus;
   wherein in the hot stab, a surface of the fixed part, extending peripherally around the fluid port, is comprised of a spherical segment.

5. The device for a valve according to claim 4, wherein the spherical segment seals with the packer element surrounding the bore.

6. A device for a valve having a hot stab and a connection block, each comprising a fixed part provided with at least one fluid port and a rotatable sleeve provided with at least one bore, wherein:
   the sleeve is structured in a manner allowing the sleeve to rotate the bore in-line with the fluid port in order to allow a fluid to flow through the fluid port and the bore when the sleeve is in an open position;
   the sleeve is structured in a manner allowing the sleeve to rotate the bore away from the fluid port in order not to allow a fluid to flow through the fluid port when the sleeve is in a closed position;
   the fixed part and the sleeve form an annulus between the fixed part and the sleeve; and
   the annulus is restricted axially by and located between two packer elements in the axial directions of the sleeve and the fixed part, wherein one of the two packer elements is located at one side of the fluid port, and the other of the two packer elements is located at the opposite side of the fluid port;
   wherein in the connection block, the annulus is further restricted by a packer element surrounding a bore in a housing of the connection block;
   wherein in the connection block, an external mantel surface of the sleeve, extending peripherally around the bore, is comprised of a spherical segment.

7. The device for a valve according to claim 6, wherein the spherical segment seals with the packer element surrounding the bore.

8. A device for a valve having a hot stab and a connection block, each comprising a fixed part provided with at least one fluid port and a rotatable sleeve provided with at least one bore, wherein:
   the sleeve is structured in a manner allowing the sleeve to rotate the bore in-line with the fluid port in order to allow a fluid to flow through the fluid port and the bore when the sleeve is in an open position;
   the sleeve is structured in a manner allowing the sleeve to rotate the bore away from the fluid port in order not to allow a fluid to flow through the fluid port when the sleeve is in a closed position;
   the fixed part and the sleeve form an annulus between the fixed part and the sleeve; and
   the annulus is restricted axially by two packer elements in the axial directions of the sleeve and the fixed part, wherein one of the two packer elements is located at one side of the fluid port, and the other of the two packer elements is located at the opposite side of the fluid port, and wherein the annulus is in fluid communication with the fluid port of the fixed part;

wherein the annulus of the connection block is further restricted by a packer element surrounding a bore in a housing of the connection block;

wherein in the connection block the fixed part is provided with a further bore, and the sleeve is provided with a further bore;

wherein the further bores are structured in a manner allowing them to be in fluid communication with each other when the sleeve is in a closed position;

wherein the further bores are structured in a manner allowing them to be in fluid communication with a third annulus; wherein each of the bores is provided with a screw element;

wherein the screw element is structured in a manner allowing it to be in selectable fluid communication with a reservoir for hydraulic fluid and with an ambient fluid;

wherein the screw element is structured in a manner allowing it to be in fluid communication with a pump via a check valve; and wherein the pump is structured in a manner allowing it to be in fluid communication with a collecting unit via a check valve.

9. A device for a valve comprising a fixed part provided with at least one fluid port and a rotatable sleeve provided with at least one bore, wherein:

the sleeve is structured in a manner allowing the sleeve to rotate the bore in-line with the fluid port in order to allow a fluid to flow through the fluid port and the bore when the sleeve is in an open position;

the sleeve is structured in a manner allowing the sleeve to rotate the bore away from the fluid port in order not to allow a fluid to flow through the fluid port when the sleeve is in a closed position;

the fixed part and the sleeve form an annulus between the fixed part and the sleeve; and the annulus is restricted axially by two packer elements in the axial directions of the sleeve and the fixed part, wherein one of the two packer elements is located at one side of the fluid port, and the other of the two packer elements is located at the opposite side of the fluid port, and wherein the annulus is in fluid communication with the fluid port of the fixed part, wherein the annulus is further restricted by a packer element surrounding a bore, wherein the fixed part is provided with a further bore, and the sleeve is provided with a further bore; wherein the bores are structured in a manner allowing them to be in fluid communication with each other when the sleeve is in a closed position; wherein the bores are structured in a manner allowing them to be in fluid communication with a third annulus; wherein each of the bores is provided with a screw element; wherein the screw element is structured in a manner allowing it to be in selectable fluid communication with a reservoir for hydraulic fluid and with an ambient fluid; wherein the screw element is structured in a manner allowing it to be in fluid communication with a pump via a check valve; and wherein the pump is structured in a manner allowing it to be in fluid communication with a collecting unit via a check valve.

10. A method of connecting a hot stab to a connection block and disconnecting the hot stab from the connection block, wherein the method comprises:

a) providing each of the hot stab and the connection block with a fixed part having at least one fluid port and a rotatable sleeve formed with at least one bore, wherein, in each of the hot stab and the connection block, the sleeve is structured in a manner allowing the sleeve to rotate the bore in-line with the fluid port in order to allow a fluid to flow through the fluid port and the bore when the sleeve is in an open position;

the sleeve is structured in a manner allowing the sleeve to rotate the bore away from the fluid port in order not to allow a fluid to flow through the fluid port when the sleeve is in a closed position;

the fixed part and the sleeve form an annulus between the fixed part and the sleeve; and the annulus is restricted axially by two packer elements in the axial directions of the sleeve and the fixed part, wherein one of the two packer elements is located at one side of the fluid port, and the other of the two packer elements is located at the opposite side of the fluid port, and wherein the annulus is in fluid communication with the fluid port of the fixed part, wherein, in the hot stab, the annulus is further restricted by a packer element surrounding a bore, facing the annulus, and wherein, in the connection block, the annulus is further restricted by a packer element surrounding a bore in a housing of the connection block;

b) inserting the hot stab into the connection block to couple the hot stab and the connection block together;

c) replacing ambient fluid in an annulus formed between each of the sleeves of the coupled hot stab and connection block with a hydraulic fluid by means of a pump sucking the hydraulic fluid into the annulus between the sleeves from a reservoir and onto the annulus via a channel formed in a screw element in communication with the bore in the housing of the connection block;

d) pumping a mixture of ambient fluid and hydraulic fluid from step c) into a collecting unit in communication with the pump;

e) rotating the sleeves of the hot stab and the connection block into an open position;

f) rotating the sleeves of the hot stab and the connection block into a closed position; and g) pulling the hot stab out of the connection block.

11. The method according to claim 10 wherein, between the steps f) and g), the method further comprises:

f1) replacing hydraulic fluid in the annulus between the sleeves of the hot stab and the connection block with the ambient fluid by means of the pump sucking ambient fluid into the annulus from the surroundings and onto the annulus via the channel in the screw element; and f2) pumping the mixture of ambient fluid and hydraulic fluid from step f1) into the collecting unit.

12. A device for a valve having a hot stab and a connection block, each comprising a fixed part provided with at least one fluid port and a rotatable sleeve provided with at least one bore, wherein:

the sleeve is structured in a manner allowing the sleeve to rotate the bore in-line with the fluid port in order to allow a fluid to flow through the fluid port and the bore when the sleeve is in an open position in which the bore and the fluid port are completely aligned;

the sleeve is structured in a manner allowing the sleeve to rotate the bore away from the fluid port in order not to allow a fluid to flow through the fluid port when the sleeve is in a closed position in which the bore and the fluid port are completely unaligned;

the fixed part and the sleeve form a first annulus between the fixed part and the sleeve; and the annulus is restricted axially by at least two packer elements in the axial directions of the sleeve and the fixed part, wherein a first one of the at least two packer elements is located at one side of the fluid port, and a second one of the at least two packer elements is located at the opposite side of the fluid port, and wherein the annulus is in fluid communication with the fluid port of the fixed part, wherein a second annulus is formed between the sleeve on the hot stab and the sleeve on the connection block, and further comprising at least two packer elements that circumferentially extend around the sleeve on the hot stab and are disposed on opposite sides of the fluid port in the axial direction of the sleeve on the hot stab, wherein the entire second annulus is in fluid connection with the bore of the sleeve of the hot stab and the bore of the sleeve of the connection block when the sleeve of the hot stab and the sleeve of the connection block are in the open position.

13. The device for a valve according to claim 12, wherein the entire second annulus is in fluid connection with the bore of the sleeve of the hot stab and the bore of the sleeve of the connection block when the sleeve of the hot stab and the sleeve of the connection block are in the closed position.

14. A device for a valve having a hot stab and a connection block, each comprising a fixed part provided with at least one fluid port and a rotatable sleeve provided with at least one bore, wherein:

the sleeve is structured in a manner allowing the sleeve to rotate the bore in-line with the fluid port in order to allow a fluid to flow through the fluid port and the bore when the sleeve is in an open position;

the sleeve is structured in a manner allowing the sleeve to rotate the bore away from the fluid port in order not to allow a fluid to flow through the fluid port when the sleeve is in a closed position;

the fixed part and the sleeve form an annulus between the fixed part and the sleeve;

the annulus is restricted axially by two packer elements in the axial directions of the sleeve and the fixed part, wherein one of the packer elements is located at one side of each of the fluid ports, and the other of the two packer elements is located at the opposite side of each of the fluid ports, wherein, when the sleeve is in the closed position;

in the hot stab, the annulus is further restricted by another packer element attached to the sleeve and surrounding the bore in the sleeve in a portion facing the annulus; and the fluid port of the fixed part is in open fluid communication with the annulus.

* * * * *